(12) United States Patent
Meere et al.

(10) Patent No.: US 10,621,570 B2
(45) Date of Patent: Apr. 14, 2020

(54) PROCESSING PAYMENTS FOR AN ONLINE MARKETPLACE (71) Applicant: Apple Inc., Cupertino, CA (US)

(72) Inventors: Lorraine Meere, San Jose, CA (US); Glenn D. Epis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 14/195,773

(22) Filed: Mar. 3, 2014

(65) Prior Publication Data
US 2015/0248663 A1   Sep. 3, 2015

(51) Int. Cl.
*G06Q 20/32*   (2012.01)
*G06Q 20/20*   (2012.01)
*G06Q 20/10*   (2012.01)
*G06Q 20/40*   (2012.01)

(52) U.S. Cl.
CPC ......... *G06Q 20/3274* (2013.01); *G06Q 20/10* (2013.01); *G06Q 20/204* (2013.01); *G06Q 20/401* (2013.01)

(58) Field of Classification Search
CPC .. G06Q 20/3274; G06Q 20/10; G06Q 20/204; G06Q 20/401
USPC .......................................................... 705/17
See application file for complete search history.

(56) References Cited

U.S. PATENT DOCUMENTS

| | | | | |
|---|---|---|---|---|
| 5,466,920 | A * | 11/1995 | Nair | G06K 7/084 235/380 |
| 8,249,965 | B2 | 8/2012 | Tumminaro | |
| 8,332,272 | B2 | 12/2012 | Fisher | |
| 8,489,067 | B2 | 7/2013 | Rackley, III et al. | |
| 2008/0275779 | A1 | 11/2008 | Lakshminarayanan | |
| 2009/0177578 | A1 * | 7/2009 | Garcia | G06Q 20/10 705/39 |
| 2010/0138344 | A1 * | 6/2010 | Wong | G06Q 20/10 705/44 |
| 2011/0244826 | A1 * | 10/2011 | Krishnan | H04M 15/00 455/405 |

(Continued)

OTHER PUBLICATIONS

Passbook, Getting Started with Passbook on iOS 6 Version 1.1, 2012 Apple Inc.*

(Continued)

*Primary Examiner* — Oluseye Iwarere
(74) *Attorney, Agent, or Firm* — Polsinelli PC (57) ABSTRACT Disclosed herein are systems, methods, and computer-readable storage devices for enabling users of mobile devices to load funds onto an account with an online marketplace. Instead of linking a payment card with the account, or requiring users to purchase a plastic card from a retailer, a user enrolls his account with the online marketplace to generate a barcode that can be rendered on the mobile device. The user presents the barcode to a merchant for scanning. The merchant scans the barcode to retrieve a serial number, which is submitted to the online marketplace to uniquely identify the user's account. Then the user can provide funds to the merchant for loading onto the account, and the merchant can use existing payment infrastructure for processing traditional physical plastic cards for loading funds. This approach avoids costs associated with distributing, manufacturing, and stocking plastic cards, and also saves shelf space at retail locations.

21 Claims, 8 Drawing Sheets

(56) References Cited

U.S. PATENT DOCUMENTS

| | | | |
|---|---|---|---|
| 2012/0078751 A1* | 3/2012 | MacPhail | G06Q 20/06 705/26.41 |
| 2012/0158581 A1* | 6/2012 | Cooley | G06Q 20/102 705/40 |
| 2012/0185398 A1 | 7/2012 | Weis et al. | |
| 2013/0346305 A1 | 12/2013 | Mendes | |
| 2014/0067677 A1* | 3/2014 | Ali | G06Q 20/02 705/44 |

OTHER PUBLICATIONS

QR4-QR Code Geographic Generator, Apr. 21, 2011 courtesy of Internet Archive Wayback Machine.*
International Search Report and Written Opinion from PCT Application No. PCT/US2015/018351 dated May 27, 2015.

* cited by examiner

PROCESSING PAYMENTS FOR AN ONLINE MARKETPLACE

BACKGROUND

1. Technical Field

The present disclosure relates to processing transactions and more specifically to enabling users to complete transactions for an online marketplace using a mobile device without purchasing a physical gift card or other physical object at a point of sale.

2. Introduction

The majority of mobile operating systems, and an increasing number of non-mobile operating systems, provide access to an online marketplace for users to purchase music, movies, software, upgrades, in-app content, and so forth. Users can add funds to their accounts for such online marketplaces in a number of ways. For example, many device owners add funds directly on the device via an associated credit or debit account. However, many users either can not or choose not to register a credit or debit account with the online marketplace. Such users can include children or teenagers, users in countries where such accounts are not widely accepted, or users who are simply leery of sharing their credit or debit account information.

These users can go to a store, purchase a gift card for the online marketplace using the payment method of their choice, and use that gift card to load funds on the account with the online marketplace. However, this approach has several disadvantages. For example, the entity operating the online marketplace must manufacture, track, and distribute physical items, such as plastic cards. These all have associated managerial and financial costs. Further, merchants must keep these physical items in stock to make sales, which occupies valuable shelf space, often at prime retail locations near the check-out counters. This approach also wastes a large amount of plastic and other shipping and packaging materials.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

DETAILED DESCRIPTION

Disclosed herein are systems and methods for allowing a user to load funds onto an account with an online marketplace without purchasing a physical item. The user presents to a point of sale device, a machine-readable code, such as a barcode rendered on a display of his or her mobile device. The point of sale device can scan the machine-readable code, and use existing transaction processing infrastructure for processing physical cards for payment to transmit a serial number to the online marketplace to initiate the transaction. Users do not need to purchase a plastic card from a merchant, and instead only present their mobile device, such as smartphone or tablet, to be scanned at the point of sale. Further, this approach can enhance customer convenience because customers do not have to scratch off a card, and enter a lengthy serial number. This approach can also reduce customer support costs due to events such as physical card scratch off code problems or lost or stolen cards. Further, this approach can enhance customer convenience because customers do not have to scratch off a protective coating on the card to reveal the redemption code and subsequently enter a lengthy redemption code at the online marketplace. Users can then load funds into their accounts with the online marketplace from any merchant location that is a reseller for the online marketplace.

Various embodiments of the disclosure are described in detail below. While specific implementations are described, it should be understood that this is done for illustration purposes only. Other components and configurations may be used without parting from the spirit and scope of the disclosure.

Figure 1:
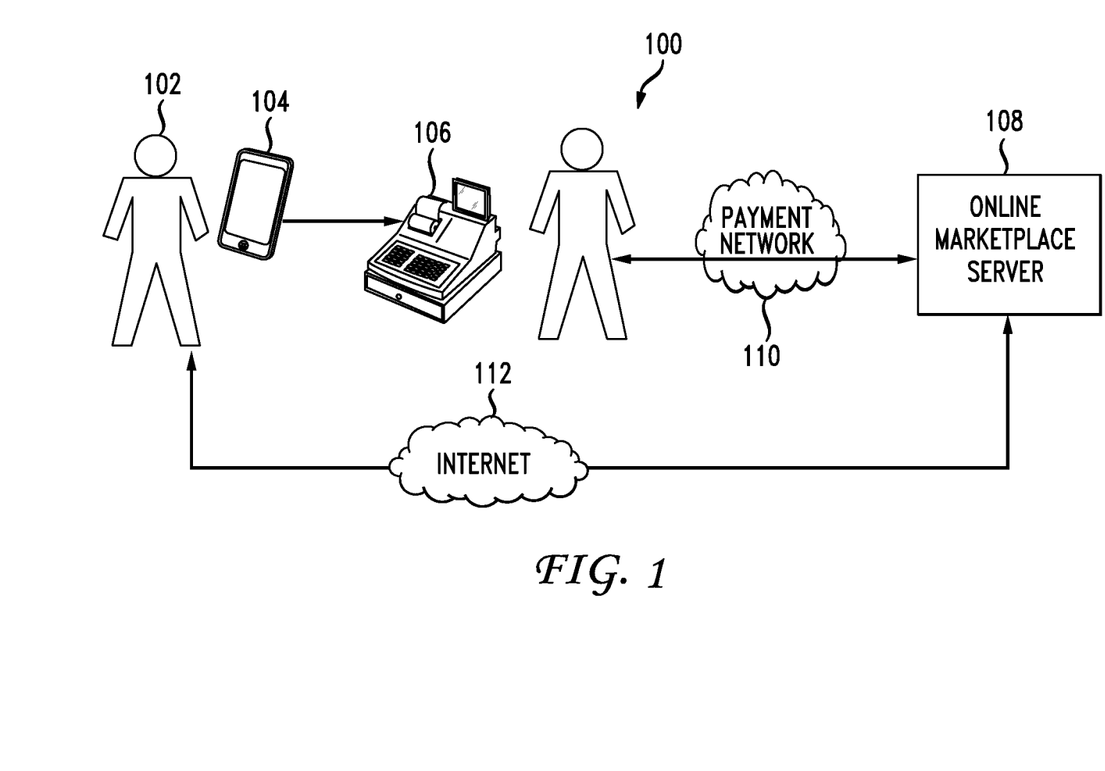
FIG. 1 illustrates an example transaction environment.

FIG. 1 illustrates an example transaction environment 100. In this environment 100, a user 102 presents, via a mobile device 104, a unique pass with a barcode to be scanned at point of sale 106. The retailer at the point of sale 106 scans the unique pass, such as via an optical scanner. The mobile device 104 can alternatively present the unique pass to the retailer via near-field communications (NFC) or some other communication medium. The unique pass can be encoded for display on a screen such as via a linear barcode, a two-dimensional or matrix bar code, or a scannable image or text. The user 102 decides how much money to add to his or her account with the online marketplace, and provides payment for that amount at the point of sale 106 via a cash, check, credit or debit card, or other payment transaction. The point of sale 106 device communicates, via a payment network 110, with an online marketplace server 108 to complete the transaction. When the transaction is complete, the funds are available immediately for use in the account of the user 102, for purchases via the mobile device 104.

For example, the user 102 can present an iPhone as the mobile device 104 with a barcode rendered on the display, such as in an app that manages various coupons, tickets, loyalty cards, and other secure documents or barcodes. The retailer scans the barcode presented on the user's iPhone at the point of sale 106. The user 102 asks the merchant to load $40.00 on her iTunes account and tenders $40.00 as payment. The user can tender the $40.00 using any payment means available at the point of sale, including cash. The merchant accesses the online marketplace server 108 via existing hardware and software payment infrastructure using a serial number identified from the barcode to load the $40.00 onto the user's iTunes account. The online marketplace server 108 updates the user's account balance, making the funds available for immediate use. The online marketplace server 108 can provide an indication of success to the point of sale 106 and can also send a notification to the user's iPhone. This approach can open a new distribution channel for loading funds onto accounts with the online marketplace server 108 without the cost and complexities of a physical card.

Figure 2:
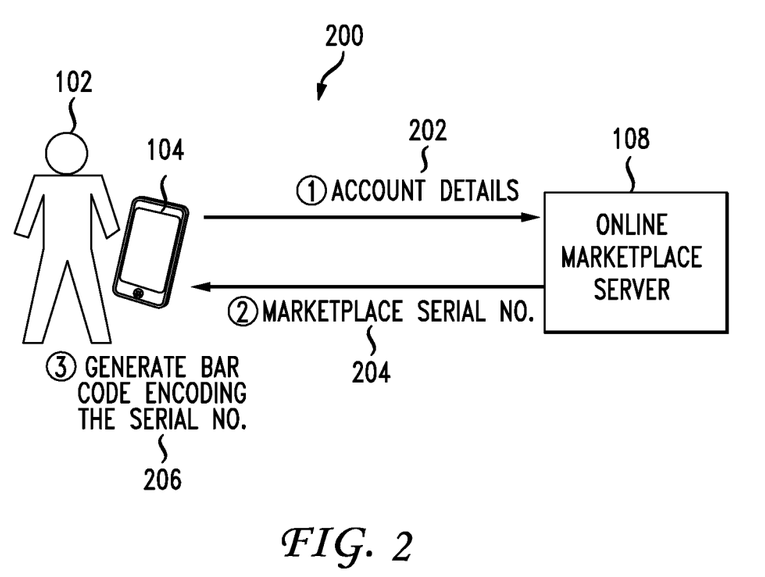
FIG. 2 illustrates an example enrollment interaction between a user and an online marketplace server.

In one variation, the user 102 enrolls prior to using this payment approach. FIG. 2 illustrates an example enrollment interaction 200 between a user and an online marketplace server that occurs prior to a payment transaction. The user 102 can open an enrollment app or an enrollment dialog of an app on a smartphone or other mobile device 104. The mobile device 104 provides account details 202 to the online marketplace server 108. The account details can include a username, password, unique identifier of the device 104, a unique account identifier, or some other information. The account details can be transmitted via or after challenge-response authentication. The online marketplace server 108 can assign a marketplace serial number 204 to an account indicated by the account details 202, and transmit that serial number 204 to the mobile device 104. The online marketplace server 108 can store this serial number 204 and account pair in a database. The serial number may be the same as the unique account identifier, but in some embodiments the serial number is completely different, and is only correlated to the account in a database accessible to the online marketplace server 108. Without this database, the serial number would be meaningless and would not contain or represent any useful information.

In one variation, the mobile device 104 uses the serial number 204 to generate a barcode encoding the serial number 206. The mobile device 104 can generate the barcode upon receiving the serial number 206, or can receive and store the serial number 206 and generate the barcode 206 on-demand. For example, the mobile device 104 can encode the serial number in different types of barcodes for different types of scanning equipment or for different merchant scenarios. The mobile device 104 can generate the barcode with an embedded timestamp which limits the barcode to being used within a specific period of time.

The online marketplace server 108 can alternatively encode the serial number 204 in a barcode and transmit the barcode to the mobile device 104. In this approach, the mobile device 104 does not generate the barcode, but simply stores the image of the barcode and displays the barcode upon request from the user 102.

Figure 3:
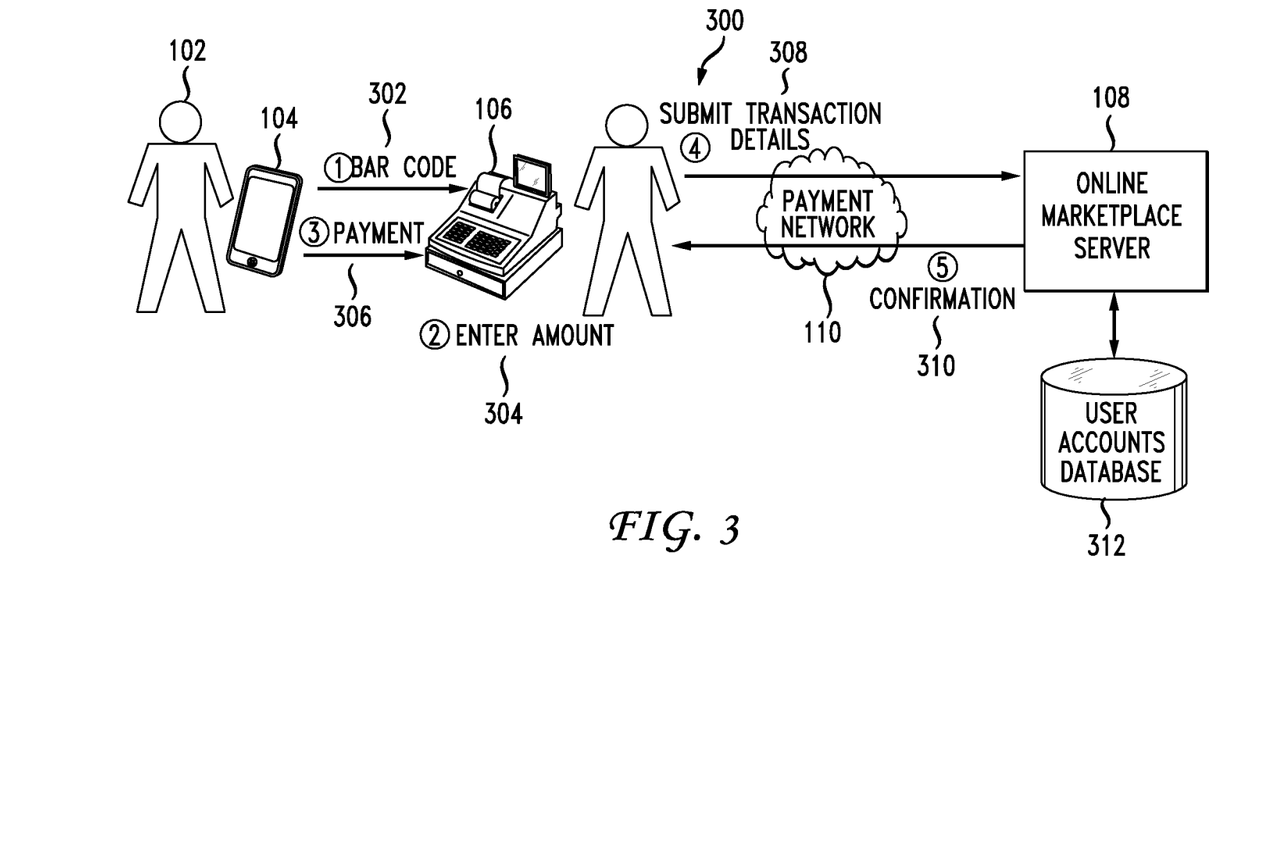
FIG. 3 illustrates an example purchase interaction in the example transaction environment.

FIG. 3 illustrates an example purchase interaction 300 in the example transaction environment 100. At step 1, the user causes the mobile device 104 to render a barcode 302 on the display and presents the barcode 302 to the point of sale 106 for scanning. At step 2, the merchant enters an amount 304 to load onto the user's account. At step 3, the user provides payment of the amount 306. At step 4, the point of sale 106 submits transaction details 308 to the online marketplace server 108 via the existing payment network 110 infrastructure. The transaction details can include an amount, a serial number extracted from the barcode 302, a payment method, a timestamp, a device identifier, a device type, or any other information gathered by the merchant or encoded in the barcode 302. The online marketplace server 108 can optionally send a confirmation 310 to the point of sale 106. The online marketplace server 108 can also optionally push a notification to the mobile device 104 that the funds have been loaded. The notification can be an email or text message, or can be a notification pushed via a network to a specific app or to the operating system of the mobile device 104. The notification can be stored in the online marketplace, so the user receives the notification the next time he or she opens the online marketplace portal on the mobile device 104 or at any other location, such as a desktop computer.

In one variation, when the user 102 uses the barcode to load funds onto his or her account, the barcode remains the same. In another variation, when the user 102 uses the barcode to load funds onto his or her account, the online marketplace server 108 can modify the barcode or the serial number, such as incrementing a counter in the barcode or incrementing a counter in a portion of the serial number, and transmit an updated barcode or an updated serial number to the mobile device 104 (or to multiple registered mobile devices).

Figure 4:
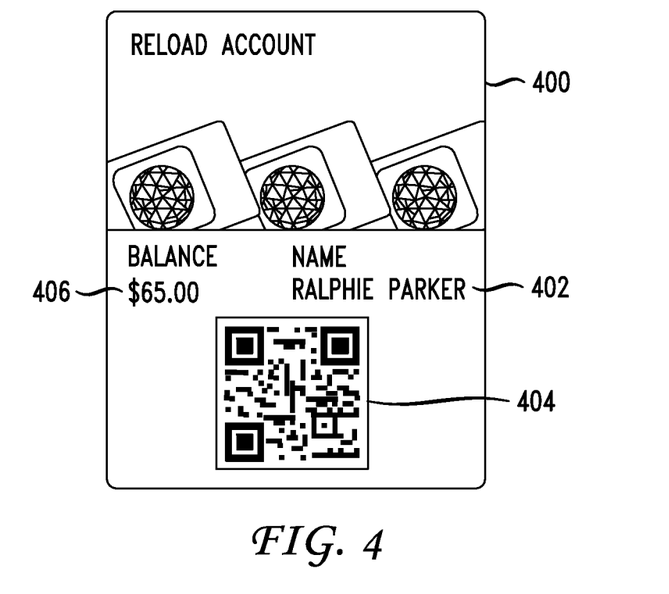
FIG. 4 illustrates an example user interface on a mobile device.

FIG. 4 illustrates an example user interface 400 on the mobile device 104. This example user interface 400 includes a name 402 of the account, the barcode 404, and an account balance 406. The name 402 allows the user to quickly determine that the barcode is for the desired account. The user interface 400 can include a barcode 404 such as a QR code, a linear barcode, or some other barcode. The user interface 400 can include multiple barcodes, or can allow the user to swipe back and forth between different barcodes or otherwise select one of a set of barcodes. Alternatively, the device can determine, based on location data, to which retailer the device is likely being presented for scanning, and automatically select a barcode type to display for known capabilities of scanning equipment at that retailer location. The account balance 406 can update dynamically to reflect purchases in the online marketplace as well as funds loaded onto the account. Because the barcode does not typically encode the account balance, an updated account balance 406 would not necessarily lead to a change in the barcode.

The mobile device 104 can provide location data via the barcode. Then the online marketplace server 108 can perform additional authentication based on the location data. An app on the mobile device 104 can further incorporate account authentication when generating the barcode. The online marketplace server 108 can manage push notifications, comparing and authenticating mobile devices based on location data, tracking account balances, encoding data into barcodes, incorporating digital signatures into barcodes, and so forth.

The mobile device 104 can have different software plugins or modules for generating different types of barcodes. For example, an app can rely on the same underlying logic, while providing a different barcode for different regions. For example, if QR codes are more popular with retailers in Japan, the app can use or retrieve a module for generating QR codes based on location when in Japan. Similarly, when in Canada, the app can determine that linear UPC barcodes are more popular and can retrieve and use a module for generating linear UPC barcodes. This approach can further apply to individual merchants, so that the app renders a barcode or other machine-readable code for a specific retailer, when the location data of the mobile device 104 indicates that the user is at the specific retailer.

The mobile device 104 can provide instructions for how to load funds onto the account with the online marketplace, especially for users who have not loaded funds before, or who do not already have an associated payment account. The mobile device 104 or the online marketplace can provide these instructions when the account balance is below a threshold, or when the user is within a threshold distance from a location that can load funds onto the account by scanning a barcode. Similarly, the mobile device 104 can incorporate a location based alert to wake the mobile phone 104 up when within the threshold distance, and automatically display the barcode, whether by opening an app or by temporarily changing a wallpaper of the mobile device lock screen, for example.

The mobile device 104 can determine location data based on GPS signals and latitude and longitude coordinates. The mobile device 104 or the online marketplace server 108 can then compare the coordinates to a database of known merchants and point of sale locations. Alternatively, a merchant can install a Wi-Fi transmitter or other wireless device that provides an identifier to the mobile device 104 indicating a location of the mobile device. This approach can be helpful for mobile devices that are not always connected or do not have GPS hardware, such as portable music players or tablets. For example, a merchant can install a Bluetooth™ puck that broadcasts location data or a location identifier that the mobile device 104 can use when generating a barcode to be scanned for a transaction with the online marketplace server 108.

Figure 5:
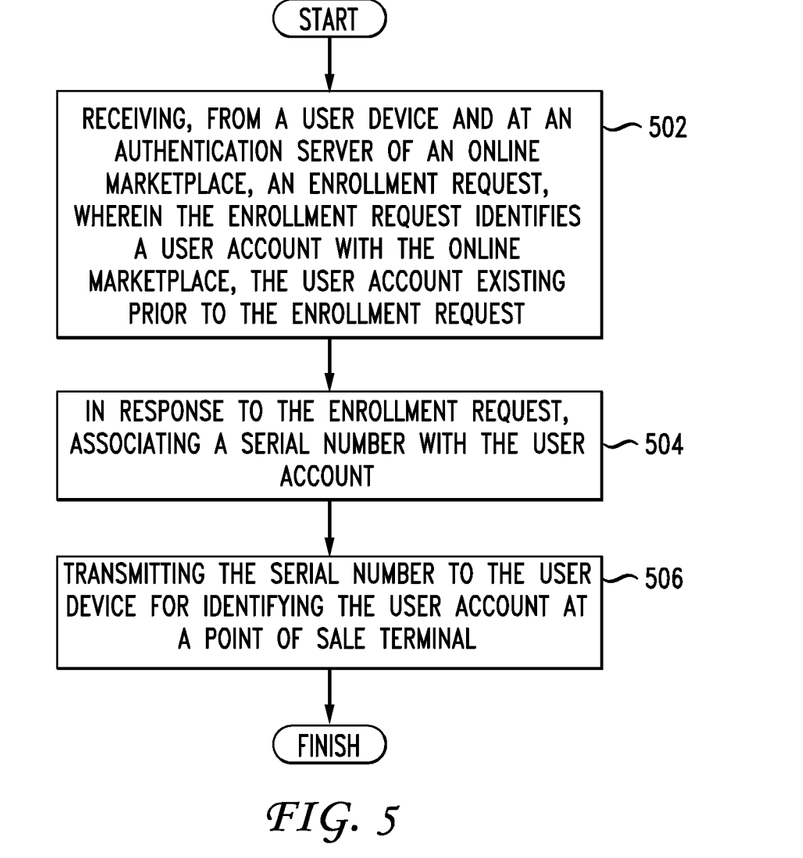
FIG. 5 illustrates an example method embodiment for enrolling a user.
Figure 6:
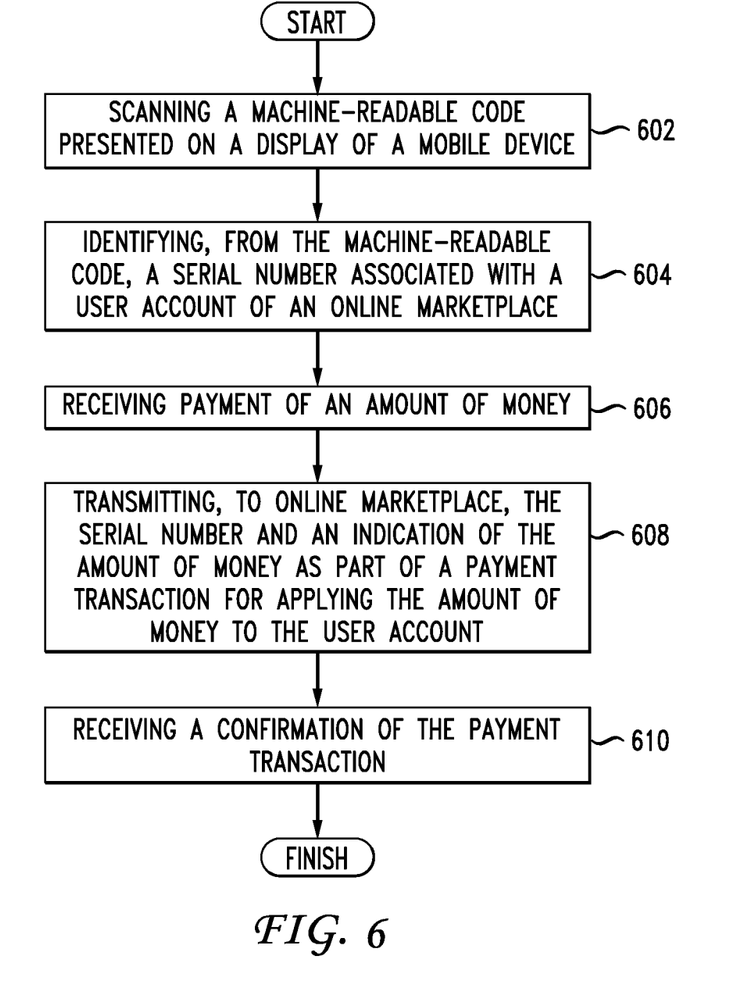
FIG. 6 illustrates an example method embodiment for processing a transaction from the standpoint of a merchant.
Figure 7:
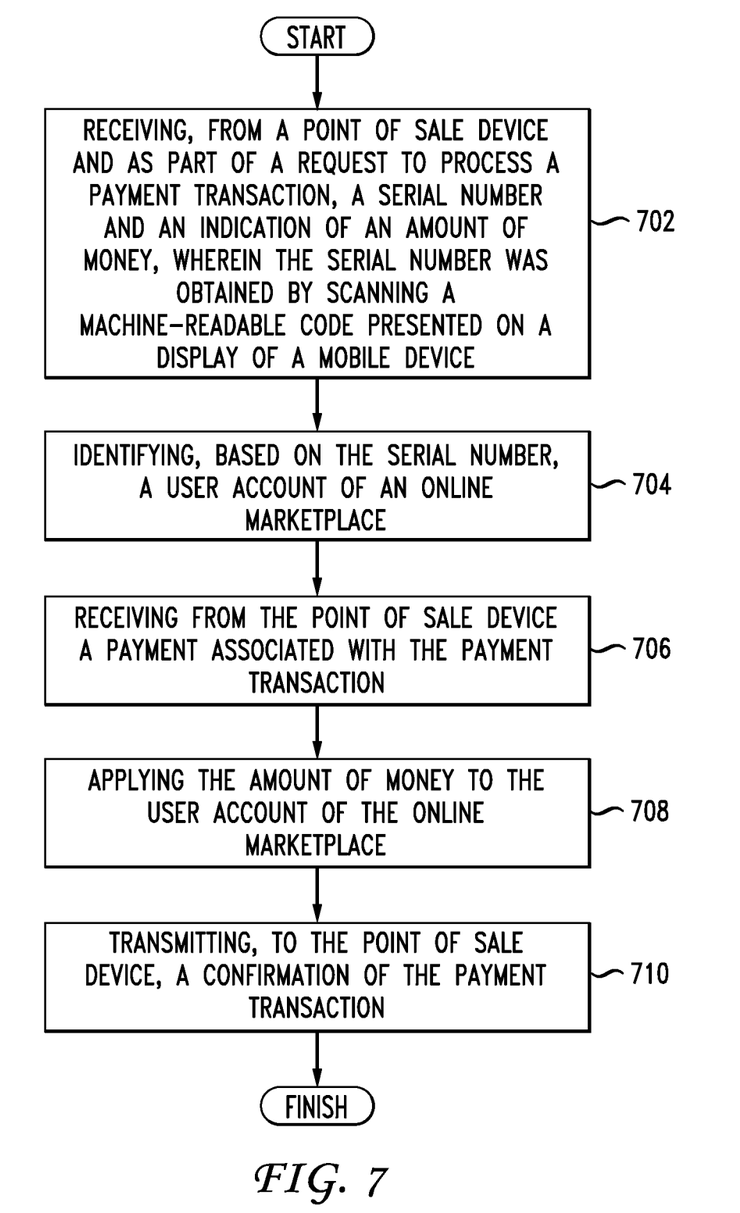
FIG. 7 illustrates an example method embodiment for processing a transaction from the standpoint of an online marketplace server.
Figure 8:
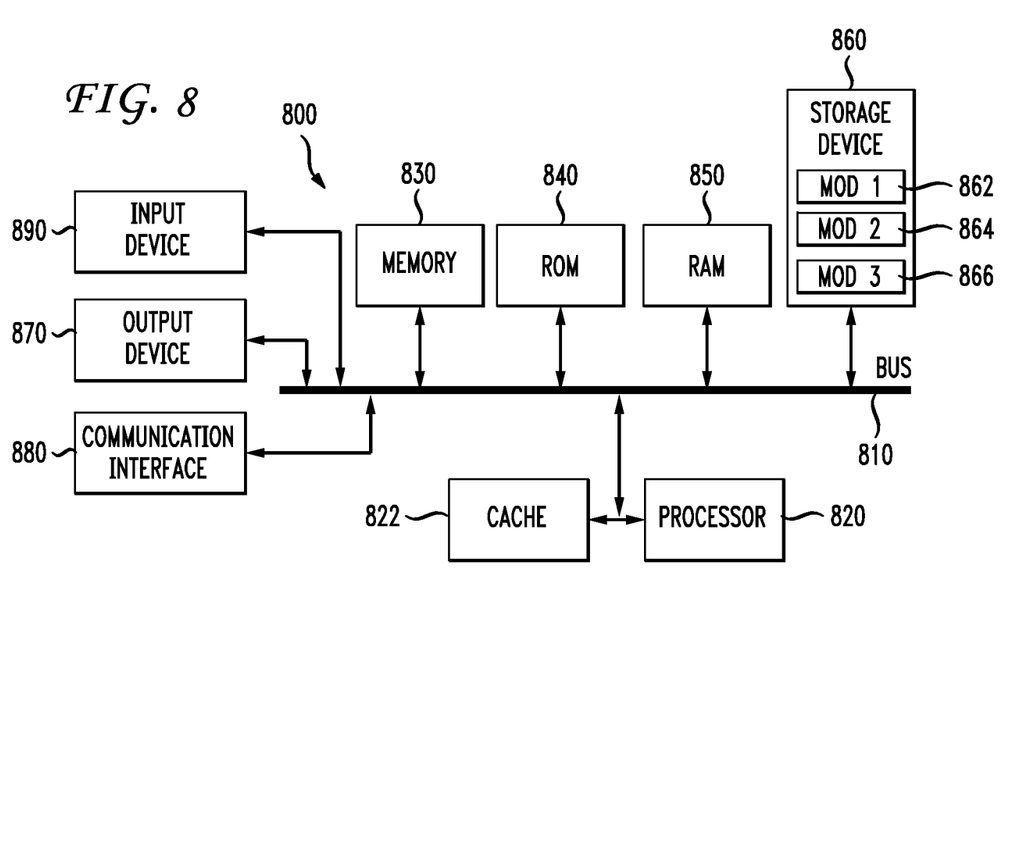
FIG. 8 illustrates an example system embodiment.

Having disclosed some basic system components and concepts, the disclosure now turns to the exemplary method embodiments shown in FIGS. 5-7. For the sake of clarity, each of the methods is described in terms of an exemplary system 800 as shown in FIG. 8 configured to practice the respective method. The steps outlined herein are exemplary and can be implemented in any combination thereof, including combinations that exclude, reorder, add, or modify certain steps.

FIG. 5 illustrates an example method embodiment for enrolling a user. The system receives, from a user device and at an authentication server of an online marketplace, an enrollment request, wherein the enrollment request identifies a user account with the online marketplace, the user account existing prior to the enrollment request (502). An app for managing bar codes from multiple sources on the user device can generate and transmit the enrollment request. The system can further receive, from the user device and at the authentication server of an online marketplace, additional account details as part of the enrollment request, and confirm the additional account details as part of an authentication routine.

In response to the enrollment request, the system can associate a serial number with the user account (504). The system can determine that an existing serial number has been associated with the user account prior to the enrollment request, and transmit the existing serial number to the user device instead of generating an entirely new serial number. In one aspect, a single serial number is used for all devices associated with the user account, while in another aspect, each device associated with the user account is associated with a different serial number. One user account can be associated with multiple serial numbers either in series or at the same time.

The system can transmit the serial number to the user device for identifying the user account at a point of sale terminal (506). The system can transmit the serial number in plain text, as an encrypted message, encoded in an image of a machine-readable code, or as instructions for generating a machine-readable code. The machine-readable code can be an image for rendering on a display, or the machine readable code can be a specially formed text or image string. The machine-readable code can also include non-visual codes, such as an audio signal or a wireless transmission such as communication via NFC devices.

FIG. 6 illustrates an example method embodiment for processing a transaction from the standpoint of a merchant. The system can scan a machine-readable code presented on a display of a mobile device (602). The machine-readable code can be a quick response (QR) code, a linear barcode, a two dimensional barcode, or a matrix barcode, for example. The mobile device can present other types of visual and/or non-visual machine-readable codes.

The system can identify, from the machine-readable code, a serial number associated with a user account of an online marketplace (604). The system can receive payment of an amount of money (606). For example, the system can prompt a store clerk to enter the amount of money. The user can provide verbal instructions regarding the amount of money or can enter the amount on a keypad on the point of sale equipment, or via the mobile device itself.

The system can transmit to the online marketplace the serial number and an indication of the amount of money as part of a payment transaction for applying the amount of money to the user account (608). The system can further identify, from the machine-readable code, location data of the mobile device, and transmit the location data to the online marketplace. The system can receive a confirmation of the payment transaction (610). In one variation, the system receives, from the online marketplace, a balance of the user account, and determines a top-up amount based on the balance. Then the system can suggest the top-up amount as the amount of money to load onto the account. For example, the system can determine an amount that is greater than $20.00 that, if added to the balance, would total the next even multiple of $5.00. If the user has a balance of $13.29, the system can suggest a top-up amount of $21.71 to reach a total of $35.00. The exact rules for suggesting top-up amounts may vary, and can be user-configurable. If the user does not configure settings for making top-up amount recommendations, the system can apply system defaults. Further, the user can enable or disable such top-up recommendations altogether.

FIG. 7 illustrates an example method embodiment for processing a transaction from the standpoint of an online marketplace server. The system can receive, from a point of sale device and as part of a request to process a payment transaction, a serial number and an indication of an amount of money, wherein the serial number was obtained by scanning a machine-readable code presented on a display of a mobile device (702). In one embodiment, the online marketplace provided the machine-readable code to the mobile device.

The system can identify, based on the serial number, a user account of an online marketplace (704). The serial number can be associated with a user account of the mobile device, or with a second user account other than the user account with which the serial number is associated. When the serial number is associated with a second user account, the system can receive an indication of an amount of credit to transfer from the second user account to the user account, and transfer the amount of credit from the second user account to the user account. This can enable a user to transfer credit between accounts, such as a parent managing credit among children's accounts, or such as a friend giving a gift.

When giving a gift of a transfer of credit from one user account to another user account, the barcode can encode additional information such as a message or electronic card from the giver to the recipient. The additional information can include instructions to the online marketplace server 108 for how or when to deliver the transfer of credit. Alternatively, this additional information can be gathered via an app on the mobile device 104 and transmitted separately to the online marketplace server 108 with an identifier for matching up the additional information with a specific transaction. Then the online marketplace server 108 can match the message with the transaction, and push a notification to a mobile device of the recipient, including at least part of the additional message.

The system can receive from the point of sale device a payment associated with the payment transaction (706) and apply the amount of money to the user account of the online marketplace (708). The system can transmit, to the point of sale device, a confirmation of the payment transaction (710). The system can also push a notification to the mobile device of the confirmation of the payment transaction. The notification can be a pop-up or email, for example. However, in one variation, the system pushes a notification to the mobile device that simply updates the balance 406, such as in the example user interface 400 of FIG. 4. In this way, the user can simply watch the user interface 400 and confirm that the transaction was successful simply based on the updated balance 406.

In yet another embodiment describing the mobile device presenting the barcode at the point of sale, the system can receive, at a mobile device, a request to initiate a payment transaction for a user account with an online marketplace. The system can retrieve, from a memory of the mobile device, a serial number associated with the user account. Then system can generate a machine-readable code storing the serial number. The system can present, on a display of the mobile device, the machine-readable code to be scanned by a point of sale device as part of the payment transaction. The machine-readable code can encode additional data including at least one of location data, user account data, credentials, an amount associated with the payment transaction, a timestamp, or a personal identification number (PIN). The serial number can be associated with the user account during an enrollment process prior to the request to initiate the payment transaction.

A brief description of a basic general purpose system or computing device in FIG. 8 which can be employed to practice the concepts, methods, and techniques is disclosed below. With reference to FIG. 8, an exemplary system and/or computing device 800 includes a processing unit (CPU or processor) 820 and a system bus 810 that couples various system components including the system memory 830 such as read only memory (ROM) 840 and random access memory (RAM) 850 to the processor 820. The system 800 can include a cache 822 of high-speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various operations or actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the processor. The processor 820 may be a self-contained computing system, containing multiple cores or processors, a bus, memory controller, cache, etc. A multi-core processor may be symmetric or asymmetric. The processor 820 can include multiple processors, such as a system having multiple, physically separate processors in different sockets, or a system having multiple processor cores on a single physical chip. Similarly, the processor 820 can include multiple distributed processors located in multiple separate computing devices, but working together such as via a communications network. Multiple processors or processor cores can share resources such as memory 830 or the cache 822, or can operate using independent resources. The processor 820 can include one or more of a state machine, an application specific integrated circuit (ASIC), or a programmable gate array (PGA) including a field PGA.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 860 can include software modules 862, 864, 866 for controlling the processor 820. The system 800 can include other hardware or software modules. The storage device 860 is connected to the system bus 810 by a drive interface. The drives and the associated computer-readable storage devices provide nonvolatile storage of computer-readable instructions, data structures, program modules and other data for the computing device 800. In one aspect, a hardware module that performs a particular function includes the software component stored in a tangible computer-readable storage device in connection with the necessary hardware components, such as the processor 820, bus 810, display 870, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 800 is a small, handheld computing device, a desktop computer, or a computer server. When the processor 820 executes instructions to perform "operations", the processor 820 can perform the operations directly and/or facilitate, direct, or cooperate with another device or component to perform the operations.

Although the exemplary embodiment(s) described herein employs the hard disk 860, other types of computer-readable storage devices which can store data that are accessible by a computer, such as magnetic cassettes, flash memory cards, digital versatile disks (DVDs), cartridges, random access memories (RAMs) 850, read only memory (ROM) 840, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations described below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited tangible computer-readable storage devices. Such logical operations can be implemented as modules configured to control the processor 820 to perform particular functions according to the programming of the module. For example, FIG. 8 illustrates three modules Mod1 862, Mod2 864 and Mod3 866 which are modules configured to control the processor 820. These modules may be stored on the storage device 860 and loaded into RAM 850 or memory 830 at runtime or may be stored in other computer-readable memory locations.

One or more parts of the example computing device 800, up to and including the entire computing device 800, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 820 can include all types of processors disclosed herein, including a virtual processor. However, when referring to a virtual processor, the processor 820 includes the software components associated with executing the virtual processor in a virtualization layer and underlying hardware necessary to execute the virtualization layer. The system 800 can include a physical or virtual processor 820 that receive instructions stored in a computer-readable storage device, which cause the processor 820 to perform certain operations. When referring to a virtual processor 820, the system also includes the underlying physical hardware executing the virtual processor 820.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method for generating a location-based barcode for use at a point of sale terminal, the method comprising:
receiving, from a user device and at an authentication server, an enrollment request, wherein the enrollment request identifies a user account, the user account existing prior to the enrollment request;
in response to the enrollment request, generating a unique serial number and associating the unique serial number with the user account;
transmitting the unique serial number to the user device for identifying the user account;
receiving, from a point of sale terminal, transaction data including the unique serial number and a fund value, wherein the unique serial number was provided to the point of sale terminal via a machine readable code generated by the user device, the client device having first determined a current location of the user device, and then generated the machine readable code, automatically in a specified format based on known capabilities of the point of sale terminal proximate to the current location; and
identifying the user account based on the unique serial number and incrementing an available fund amount of the user account based on the fund value.

2. The method of claim 1, wherein the unique serial number is transmitted in plain text.

3. The method of claim 1, wherein the unique serial number is transmitted encoded in the machine-readable code.

4. The method of claim 1, further comprising:
receiving, from a second user device, a second enrollment request that identifies a second user account, the second user account existing prior to the enrollment request;
determining that an existing unique serial number has already been associated with the second user account prior to the enrollment request; and
transmitting the existing unique serial number to the second user device.

5. The method of claim 1, wherein the enrollment request is received from an app on the user device for managing bar codes from multiple sources.

6. The method of claim 1, further comprising:
receiving, from the user device and at the authentication server, additional account details as part of the enrollment request; and
confirming the additional account details.

7. A system comprising:
a computer processor; and
a computer-readable storage device storing instructions which, when executed by the computer processor, cause the system to perform operations comprising:
scanning a machine-readable code presented on a display of a mobile device, the mobile device having first determined a current location of the mobile device, and then generated the machine readable code, automatically in a specified format based on known capabilities of the point of sale terminal proximate to the current location;
identifying, from the machine-readable code, a unique serial number associated with a user account;
receiving a monetary payment of a fund amount value;
transmitting, to a server, a payment transaction to apply the monetary payment to the user account, the payment transaction including the unique serial number and the fund amount value; and
receiving a confirmation of the payment transaction, the confirmation indicating that an available fund amount of the user account has been incremented by the fund amount value.

8. The system of claim 7, wherein the machine-readable code comprises at least one of a quick response (QR) code, a linear barcode, a two dimensional barcode, or a matrix barcode.

9. The system of claim 7, the computer-readable storage device further storing instructions which result in the operations further comprising:
prompting a clerk to enter the fund amount value.

10. The system of claim 7, the computer-readable storage device further storing instructions which result in the operations further comprising:
- identifying, from the machine-readable code, location data indicating the current location of the mobile device; and
- transmitting the location data to the server.

11. The system of claim 7, the computer-readable storage device further storing instructions which result in the operations further comprising:
- receiving, from the server, a balance of the user account;
- determining a top-up amount based on the balance; and
- suggesting the top-up amount.

12. A computer-readable storage device storing instructions which, when executed by a computing device, cause the computing device to perform operations comprising:
- receiving, from a point of sale device and as part of a request to process a payment transaction, a serial number and an indication of an amount of money, wherein the serial number was obtained by scanning a machine-readable code presented on a display of a mobile device, the having first determined a current location of the mobile device, and then generated the machine readable code automatically in a specified format based on known capabilities of the point of sale device proximate to the current location;
- identifying, based on the serial number, a user account;
- receiving from the point of sale device a payment associated with the payment transaction;
- applying the amount of money to the user account; and
- transmitting, to the point of sale device, a confirmation of the payment transaction.

13. The computer-readable storage device of claim 12, storing additional instructions which result in the operations further comprising:
- pushing a notification to the mobile device of the confirmation of the payment transaction.

14. The computer-readable storage device of claim 12, wherein the serial number is associated with a user account of the mobile device.

15. The computer-readable storage device of claim 12, wherein the mobile device is associated with a second user account other than the user account with which the serial number is associated.

16. The computer-readable storage device of claim 15, storing additional instructions which result in the operations further comprising:
- receiving an indication of an amount of credit to transfer from the second user account to the user account; and
- transferring the amount of credit from the second user account to the user account.

17. A method comprising:
- receiving, at a mobile device, a request to initiate a payment transaction for a user account;
- retrieving, from a memory of the mobile device, a serial number associated with the user account;
- determining a current location of the mobile device;
- generating a machine-readable code storing the serial number in a specified format based on the current location of the mobile device; and
- presenting, on a display of the mobile device, the machine-readable code to be scanned by a point of sale device as part of the payment transaction.

18. The method of claim 17, wherein the serial number is managed via an app on the mobile device for managing bar codes from multiple sources.

19. The method of claim 17, wherein the machine-readable code encodes additional data comprising at least one of location data, user account data, credentials, an amount associated with the payment transaction, a timestamp, or a personal identification number (PIN).

20. The method of claim 17, wherein the serial number was associated with the user account as part of an enrollment process prior to the request to initiate the payment transaction.

21. The method of claim 17, further comprising:
- presenting, on the display of the mobile device, a balance of the user account.

\* \* \* \* \*